(12) United States Patent
Lee et al.

(10) Patent No.: US 9,019,811 B2
(45) Date of Patent: *Apr. 28, 2015

(54) METHOD AND APPARATUS FOR GENERATING RANGING PREAMBLE CODE IN WIRELESS COMMUNICATION SYSTEM

(75) Inventors: Hyun Woo Lee, Seoul (KR); Han Gyu Cho, Seoul (KR); Jin Sam Kwak, Seoul (KR); Yeong Hyeon Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 354 days.

This patent is subject to a terminal disclaimer.

(21) Appl. No.: 12/909,776

(22) Filed: Oct. 21, 2010

(65) Prior Publication Data

US 2011/0103219 A1 May 5, 2011

Related U.S. Application Data

(60) Provisional application No. 61/258,205, filed on Nov. 5, 2009, provisional application No. 61/262,090, filed on Nov. 17, 2009.

(30) Foreign Application Priority Data

Oct. 7, 2010 (KR) .................. 10-2010-0097712

(51) Int. Cl.
*H04J 11/00* (2006.01)
*H04L 27/26* (2006.01)

(52) U.S. Cl.
CPC .................. *H04L 27/2613* (2013.01)

(58) Field of Classification Search
USPC ........................................ 370/210
See application file for complete search history.

(56) References Cited

U.S. PATENT DOCUMENTS

| 7,920,508 | B2 * | 4/2011 | Chang et al. ................ 370/324 |
| 2008/0075195 | A1 * | 3/2008 | Pajukoski et al. ............ 375/298 |
| 2008/0080472 | A1 * | 4/2008 | Bertrand et al. ............. 370/344 |
| 2009/0097465 | A1 * | 4/2009 | Inoue et al. .................. 370/342 |
| 2010/0074343 | A1 * | 3/2010 | Gaal et al. ................... 375/259 |

(Continued)

FOREIGN PATENT DOCUMENTS

| CN | 101217793 | 7/2008 |
| CN | 101336003 | 12/2008 |
| CN | 101409584 | 4/2009 |

(Continued)

OTHER PUBLICATIONS

IEEE 802.11, Telecommunications and information exchange between systems, local and metropolitan networks—Specific requirements, Mar. 8, 2007, Part 11, all.*

Clerk, Bruno et al., Multiuser MIMO made Practical: Application to 802.16m, 2009, all.*

(Continued)

*Primary Examiner* — Omar Ghowrwal
*Assistant Examiner* — Angel Brockman
(74) *Attorney, Agent, or Firm* — Lee, Hong, Degerman, Kang & Waimey

(57) ABSTRACT

A method and apparatus of generating a ranging preamble code in a wireless communication system comprises generating a Zadoff-Chu (ZC) sequence in which a cyclic shift is applied to each of a plurality of orthogonal frequency division multiple access (OFDMA) symbols as a ranging preamble code, wherein the cyclic shift is applied for each OFDMA symbol.

14 Claims, 14 Drawing Sheets

(a)

(b)

(56) References Cited

U.S. PATENT DOCUMENTS

| | | | | |
|---|---|---|---|---|
| 2010/0111219 A1* | 5/2010 | Wang et al. | ............. | 375/295 |
| 2010/0150100 A1* | 6/2010 | Chen et al. | ............. | 370/330 |
| 2011/0007627 A1* | 1/2011 | Lee et al. | ............. | 370/210 |
| 2011/0051667 A1* | 3/2011 | Park et al. | ............. | 370/328 |

FOREIGN PATENT DOCUMENTS

| JP | 2011-515055 | 5/2011 |
|---|---|---|
| WO | 2010/066204 | 6/2010 |

OTHER PUBLICATIONS

Maguire, Jr, G.Q., Wireless Network Architecturew, 2009,KTH Information and Communication Technology,Period 3, all.*
The Mobile Brodband Evolution, Feb. 2009, 3GPP Release 8 , all.*
Japan Patent Office Application Serial No. 2010-247795, Office Action dated Dec. 11, 2012, 3 pages.
The State Intellectual Property Office of the People's Republic of China Application Serial No. 201010536794.5, Office Action dated Jan. 14, 2013, 5 pages.

* cited by examiner

| Original code | 0 | 1 | 2 | 3 |
|---|---|---|---|---|
| Cyclic shifted code | 2 | 3 | 0 | 1 |
| | | | | | one symbol (b)

| Original code | 0 | 1 | 2 | 3 | 4 | 5 | 6 | 7 | 8 | 9 | 10 | 11 |
|---|---|---|---|---|---|---|---|---|---|---|---|---|
| Cyclic shifted code | 10 | 11 | 0 | 1 | 2 | 3 | 4 | 5 | 6 | 7 | 8 | 9 |

$1^{st}$ symbol     $2^{nd}$ symbol     $3^{rd}$ symbol

FIG. 8

| Original code | 0 | 1 | 2 | 3 | 4 | 5 | 6 | 7 | 8 | 9 | 10 | 11 |
|---|---|---|---|---|---|---|---|---|---|---|---|---|
| Cyclic shifted code | 3 | 2 | 0 | 1 | 6 | 7 | 4 | 5 | 10 | 11 | 8 | 9 |

1st symbol     2nd symbol     3rd symbol

METHOD AND APPARATUS FOR GENERATING RANGING PREAMBLE CODE IN WIRELESS COMMUNICATION SYSTEM

CROSS-REFERENCE TO RELATED APPLICATIONS

Pursuant to 35 U.S.C. 119, this application claims the benefit of earlier filing date and right of priority to Korean Application No. 10-2010-0097712, filed on Oct. 7, 2010, and also claims the benefit of U.S. Provisional Application Ser. No. 61/262,090, filed on Nov. 17, 2009 and 61/258,205 filed on Nov. 5, 2009, the contents of all of which are all incorporated by reference herein in their entireties.

BACKGROUND OF THE INVENTION

1. Field of the Invention

The present invention relates to wireless communications, and more particularly, to a method and apparatus for generating a ranging preamble code in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

An uplink control channel can be defined for transmission of an uplink control signal. Examples of the uplink control channel are various such as a fast feedback channel, a hybrid automatic repeat request (HARQ) feedback channel, a sounding channel, a ranging channel, a bandwidth request channel, etc. The fast feedback channel carries feedback of a channel quality indicator (CQI) and/or multiple-input multiple-output (MIMO) information, and can be classified into a primary fast feedback channel and a secondary fast feedback channel. The HARQ feedback channel is a channel for transmitting an acknowledgement (ACK)/non-acknowledgement (NACK) signal as a response for data transmission. The sounding channel can be used as an uplink channel response for closed-loop MIMO transmission and uplink scheduling. The bandwidth request channel is a channel for requesting a radio resource for transmitting a control signal or uplink data to be transmitted by a mobile station (MS).

The ranging channel can be used for uplink synchronization. The ranging channel can be classified into a non-synchronized ranging channel (NS-RCH) for a non-synchronized mobile station (MS) and a synchronized ranging channel (S-RCH) for a synchronized MS. The NS-RCH can be used for initial access and handover. In a subframe in which the NS-RCH is to be transmitted, an MS may not transmit any uplink burst or uplink control channel. The S-RCH can be used for periodic ranging. An MS which has already been synchronized to a target base station (BS) can transmit a ranging signal for the synchronized MS.

A ranging preamble code can be transmitted through the ranging channel. Various types of codes or sequences such as a Zadoff-Chu (ZC) sequence or the like can be used as a ranging preamble code, and a cyclic shift can be applied thereto. The ranging preamble code can be transmitted by mapping to at least one orthogonal frequency-division multiple access (OFDMA) symbol allocated to the ranging channel.

A method for applying a cyclic shift when a ranging preamble code is mapped to a plurality of OFDMA symbols is required.

SUMMARY OF THE INVENTION

The present invention provides a method and apparatus for generating a ranging preamble code in a wireless communication system.

In an aspect, a method of generating a ranging preamble code in a wireless communication system is provided. The method include generating a Zadoff-Chu (ZC) sequence in which a cyclic shift is applied to each of a plurality of orthogonal frequency division multiple access (OFDMA) symbols as a ranging preamble code, wherein the cyclic shift is applied for each OFDMA symbol. The cyclic shift may be determined by $$\exp\left(-\frac{j \cdot \pi \cdot 2 \cdot k \cdot s_p \cdot N_{TCS}}{N_{FFT}}\right), k = 0, 1, \ldots, N_{RP} - 1,$$

where $s_p$ is a cyclic shift index, $N_{TCS}$ is a cyclic shift unit in a time domain, $N_{FFT}$ is a fast Fourier transform (FFT) size, and $N_{RP}$ is a length of the ranging preamble code per OFDMA symbol. $N_{TCS} = G * N_{FFT}$, where G is a cyclic prefix (CP) ratio and $N_{FFT}$ is an FFT size. The ranging preamble code may be determined by $$x_p(n,k) = \exp\left(-j \cdot \pi\left(\frac{r_p \cdot (n \cdot 71 + k)(n \cdot 71 + k + 1)}{211} + \frac{2 \cdot k \cdot s_p \cdot N_{TCS}}{N_{FFT}}\right)\right),$$

$$k = 0, 1, \ldots, N_{RP} - 1; n = 0, 1, 2$$

where $r_p$ is a root index of the ZC sequence, $s_p$ is a cyclic shift index, $N_{TCS}$ is a cyclic shift unit in a time domain, $N_{FFT}$ is an FFT size, $N_{RP}$ is a length of the ranging preamble code per OFDMA symbol, and n is an OFDMA symbol index. A length of the ranging preamble code may be 72. The number of the plurality of OFDMA symbols may be 3. The method may further include mapping the generated ranging preamble code to each OFDMA symbol. A cyclic shift unit by which the cyclic shift is applied may be equal to or less than a length of the ranging preamble code. The ranging preamble code may be used for periodic ranging through a synchronized ranging channel (S-RCH).

In another aspect, an apparatus for generating a ranging preamble code is provided. The apparatus include a radio frequency (RF) unit for transmitting or receiving a radio signal, and a processor coupled to the RF unit, wherein the processor is configured to generate a Zadoff-Chu (ZC) sequence in which a cyclic shift is applied to each of a plurality of orthogonal frequency division multiple access (OFDMA) symbols as a ranging preamble code, and the cyclic shift is applied for each OFDMA symbol. A length of the ranging preamble code may be 72. The number of the plurality of OFDMA symbols may be 3. The processor may be further configured to map the generated ranging preamble code to each OFDMA symbol.

BRIEF DESCRIPTION OF THE DRAWINGS

FIG. 7 shows a case where a cyclic-shifted sequence is mapped to one OFDMA symbol or a plurality of OFDMA symbols.
FIG. 8 shows a case where a ranging preamble code generated by the proposed ranging preamble code generation method is mapped to a plurality of OFDMA symbols.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LET) is part of evolved UMTS (E-UMTS) using evolved-UMTS terrestrial radio access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

Figure 1:
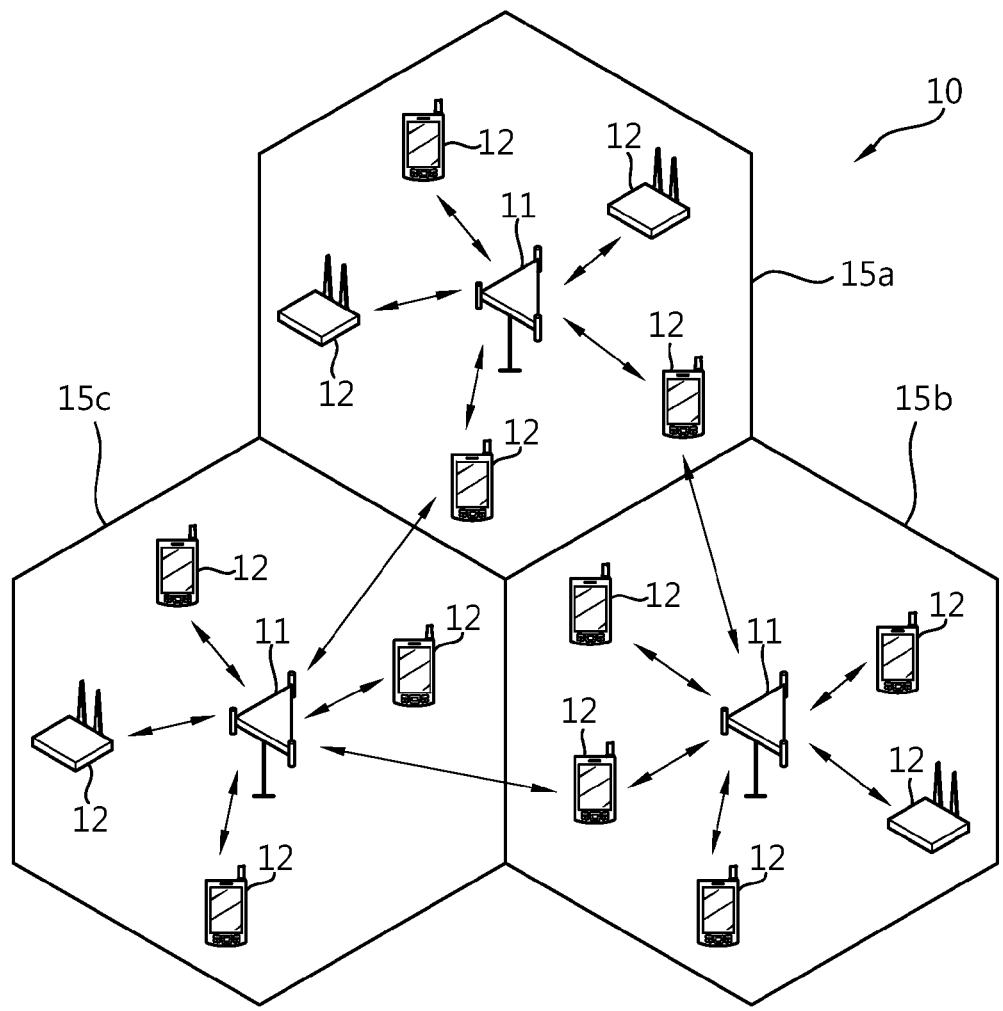
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
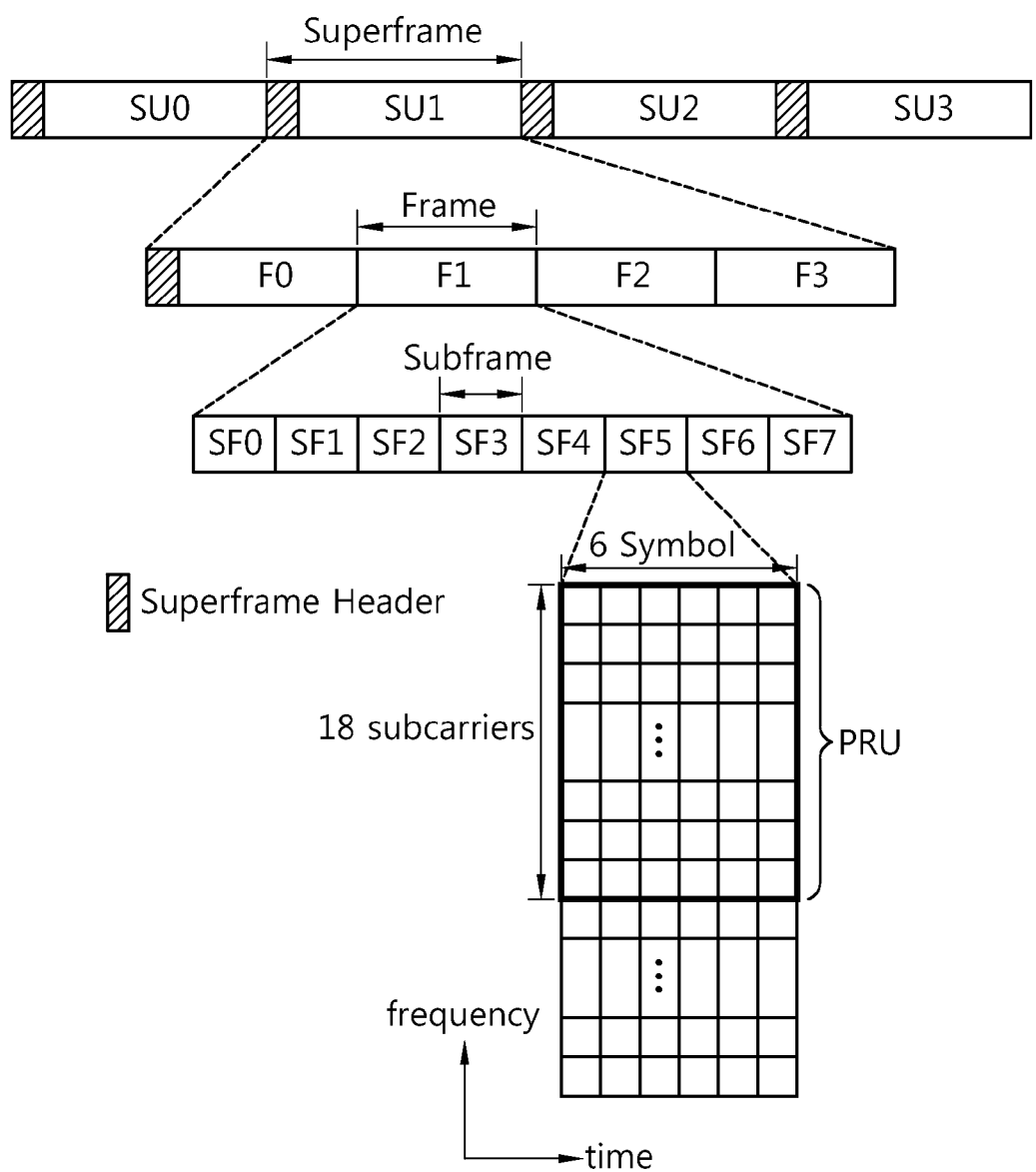
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDMA symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) can carry an essential system parameter and system configuration information. The SFH may be located in a first subframe of a superframe. The SFH may occupy last 5 Orthogonal Frequency-Division Multiple Access (OFDMA) symbols of the first subframe. The SFH can be classified into a primary-SFH (P-SFH) and a secondary-SFH (S-SFH). The P-SFH and the S-SFH can be transmitted in every superframe. The S-SFH can be transmitted in two consecutive superframes. Information transmitted on the S-SFH can be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP1 may include information on a ranging channel, resource mapping information such as subband partitioning and frequency partitioning, legacy support information for the support of an IEEE 802.16e mobile station (MS), etc. The S-SFH SP2 includes information on initial network entry and network discovery. The S-SFH SP3 includes other important system information.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| | | | | | | |
|---|---|---|---|---|---|---|
| Channel bandwidth, BW (MHz) | | 5 | 7 | 8.75 | 10 | 20 |
| Sampling factor, n | | 28/25 | 8/7 | 8/7 | 28/25 | 28/25 |
| Sampling frequency, Fs (MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$ (kHz) | | 10.94 | 7.81 | 9.77 | 10.94 | 10.94 |
| Useful symbol time, Tb (μs) | | 91.4 | 128 | 102.4 | 91.4 | 91.4 |
| G = 1/8 | Symbol time, Ts (μs) | 102.857 | 144 | 115.2 | 102.857 | 102.857 |
| | FDD Number of OFDMA symbols per 5 ms frame | 48 | 34 | 43 | 48 | 48 |
| | Idle time (μs) | 62.857 | 104 | 46.40 | 62.857 | 62.857 |
| | TDD Number of OFDMA symbols per 5 ms frame | 47 | 33 | 42 | 47 | 47 |
| | TTG + RTG (μs) | 165.714 | 248 | 161.6 | 165.714 | 165.714 |
| G = 1/16 | Symbol time, Ts (μs) | 97.143 | 136 | 108.8 | 97.143 | 97.143 |
| | FDD Number of OFDMA symbols per 5 ms frame | 51 | 36 | 45 | 51 | 51 |
| | Idle time (μs) | 45.71 | 104 | 104 | 45.71 | 45.71 |
| | TDD Number of OFDMA symbols per 5 ms frame | 50 | 35 | 44 | 50 | 50 |
| | TTG + RTG (μs) | 142.853 | 240 | 212.8 | 142.853 | 142.853 |
| G = 1/4 | Symbol time, Ts (μs) | 114.286 | 160 | 128 | 114.286 | 114.286 |
| | FDD Number of OFDMA symbols per 5 ms frame | 43 | 31 | 39 | 43 | 43 |
| | Idle time (μs) | 85.694 | 40 | 8 | 85.694 | 85.694 |
| | TDD Number of OFDMA symbols per 5 ms frame | 42 | 30 | 38 | 42 | 42 |
| | TTG + RTG (μs) | 199.98 | 200 | 136 | 199.98 | 199.98 |

TABLE 1-continued

| | | | | | |
|---|---|---|---|---|---|
| Number of Guard | Left | 40 | 80 | 80 | 80 | 160 |
| subcarriers | Right | 39 | 79 | 79 | 79 | 159 |
| Number of used subcarriers | | 433 | 865 | 865 | 865 | 1729 |
| Number of PRU in type-1 subframe | | 24 | 48 | 48 | 48 | 96 |

In Table 1, $N_{FFT}$ denotes a smallest power of 2 greater than $N_{used}$. A sampling factor is defined as $F_s$=floor(n·BW/8000)× 8000. A subcarrier spacing is defined as $\Delta f=F_s/N_{FFT}$. A useful symbol time is defined as $T_b=1/\Delta f$. A CP time is defined as $T_g=G\cdot T_b$. An OFDMA symbol time is defined as $T_s=T_b+T_g$. A sampling time is defined as $T_b/N_{FFT}$.

Figure 3:
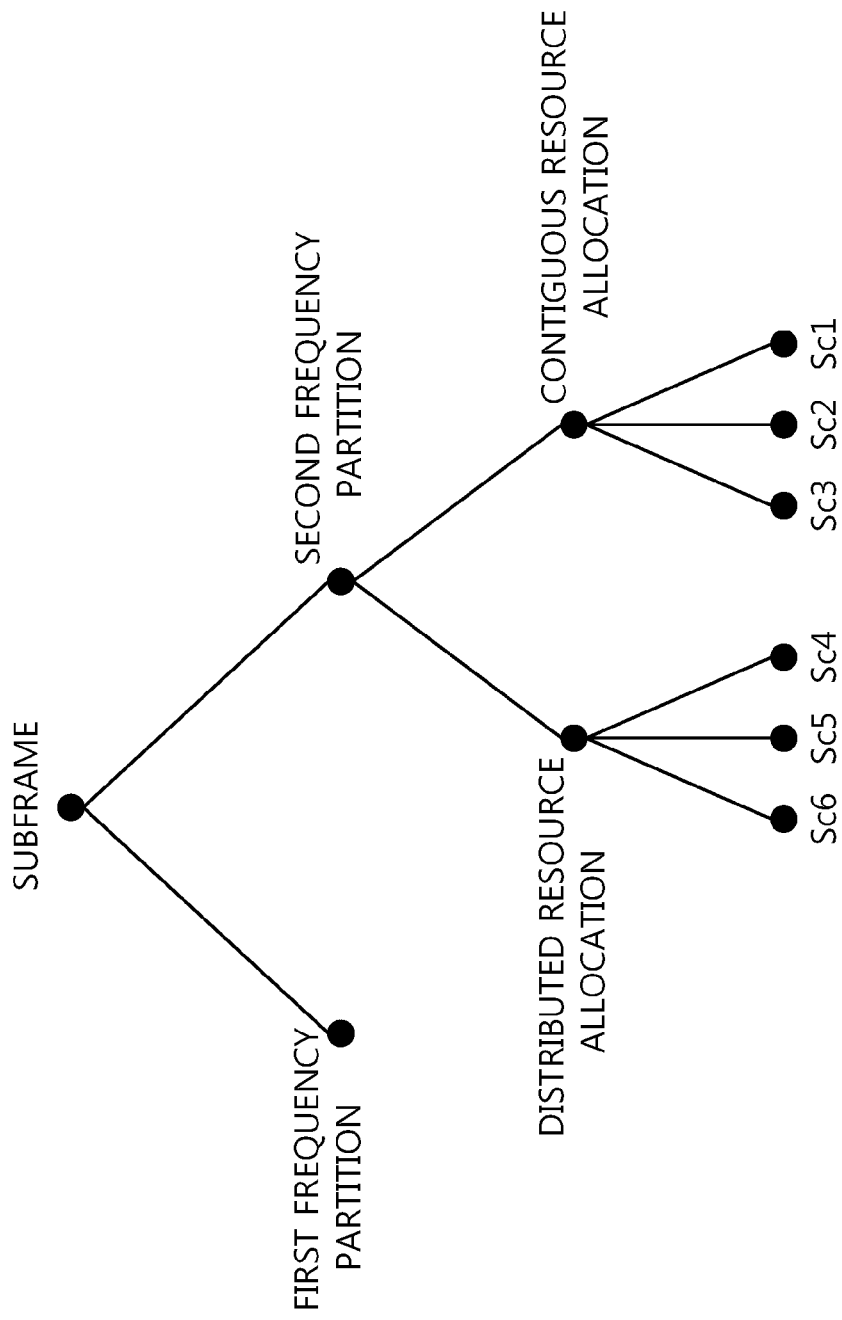
FIG. 3 shows an example of an uplink radio resource.

FIG. 3 shows an example of an uplink radio resource.

Each uplink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed PRUs. Each frequency partition may be used for other purposes such as fractional frequency reuse (FFR). The second frequency partition (i.e., FP2) of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be equal to the number of OFDMA symbols included in one subframe. Therefore, Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations.

A distributed logical resource unit (DLRU) can be used to obtain a frequency diversity gain. An uplink DLRU may consist of subcarriers included in 3 tiles distributed in one frequency partition. The tile is a basic unit of constituting the uplink DLRU. A size of an uplink tile may be 6*Nsym, where Nsym may vary depending on the subframe type.

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU.

Hereinafter, a synchronized ranging channel (S-RCH) will be described.

The S-RCH is used for periodic ranging. A mobile station (MS) which has already been synchronized to a target base station (BS) periodically transmits a ranging signal to the BS. In a femto-cell, the MS can perform initial ranging, handover ranging, or periodic ranging by using the S-RCH.

Figure 4:
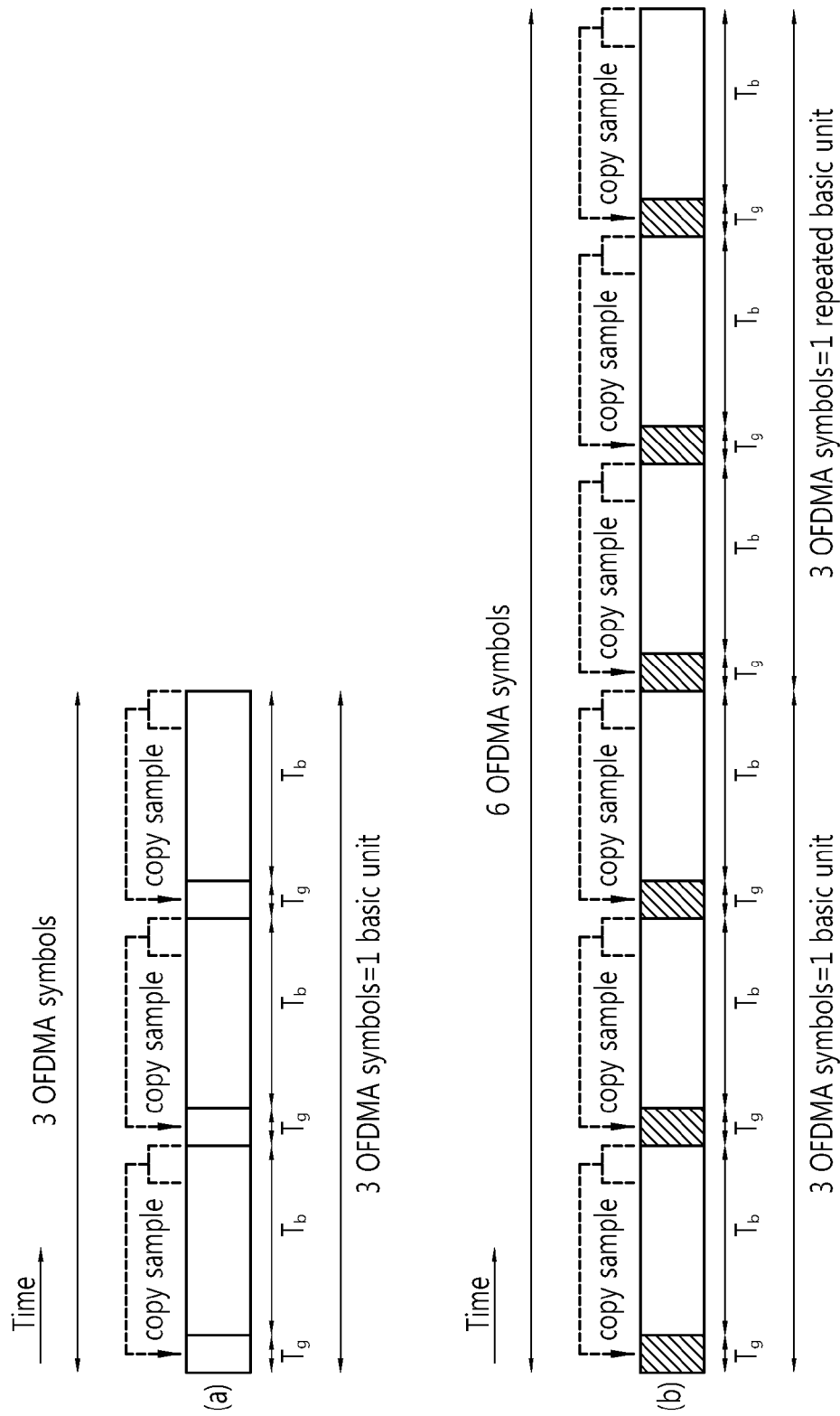
FIG. 4 shows a structure of an S-RCH in a time domain.

FIG. 4 shows a structure of an S-RCH in a time domain. FIG. 4A shows a structure of a basic unit of constituting the S-RCH, and FIG. 4B shows a structure of the S-RCH consisting of the basic unit. The basic unit occupies 72 subcarrier and 3 OFDMA symbols. A signal waveform corresponding to the basic unit is generated by a ranging preamble code. The S-RCH occupies 72 subcarriers and 6 OFDMA symbols from a $1^{st}$ OFDMA symbol in a subframe. Two repeated basic units constitute the S-RCH.

A padded Zadoff-Chu (ZC) code can be used as the ranging preamble code of the S-RCH. Equation 1 shows an example of the ranging preamble code used in the S-RCH.

$$x_p(n, k) = \exp\left(-j \cdot \pi \frac{r_p \cdot (k + s_p \cdot m)(k + s_p \cdot m + 1)}{N_{RP} - 1}\right) \cdot c_q(n), \quad \text{[Equation 1]}$$

$$k = 0, 1, \ldots, N_{RP} - 1$$

In Equation 1, p denotes an index of a ranging preamble code for an $n^{th}$ OFDMA symbol in a basic unit. The ranging preamble code of Equation 1 can be generated by applying an $s_p^{th}$ cyclic shift having a cyclic shift unit m from a ZC sequence having a root index $r_p$. Herein, m denotes a cyclic shift unit, and $N_{RP}$ denotes a length of the ranging preamble code.

Ranging channel allocation information may include ranging configuration information. The ranging configuration information can indicate a subframe offset $O_{SF}$ by which a resource for the ranging channel is allocated in the time domain. A radio resource of the time domain in which a non-synchronized ranging channel (NS-RCH) and the S-RCH are allocated can be determined by the subframe offset.

Table 2 shows the ranging channel allocation information of the S-RCH. A subframe in which the S-RCH is allocated is determined according to Table 2. In this case, the number $N_{UL}$ of uplink subframes per frame is greater than 1.

TABLE 2

| Configurations | The subframe allocating Ranging channel |
|---|---|
| 0 | mod($O_{SF}$ + 1, $N_{UL}$)$^{th}$ UL AAI subframe in every frame |
| 1 | mod($O_{SF}$ + 1, $N_{UL}$)$^{th}$ UL AAI subframes in the first frame in every superframe |
| 2 | mod($O_{SF}$ + 1, $N_{UL}$)$^{th}$ UL AAI subframe in the first frame in every $4^{th}$ superframe |
| 3 | mod($O_{SF}$ + 1, $N_{UL}$)$^{th}$ UL AAI subframe of the first frame in every $8^{th}$ superframe |

Figure 5:
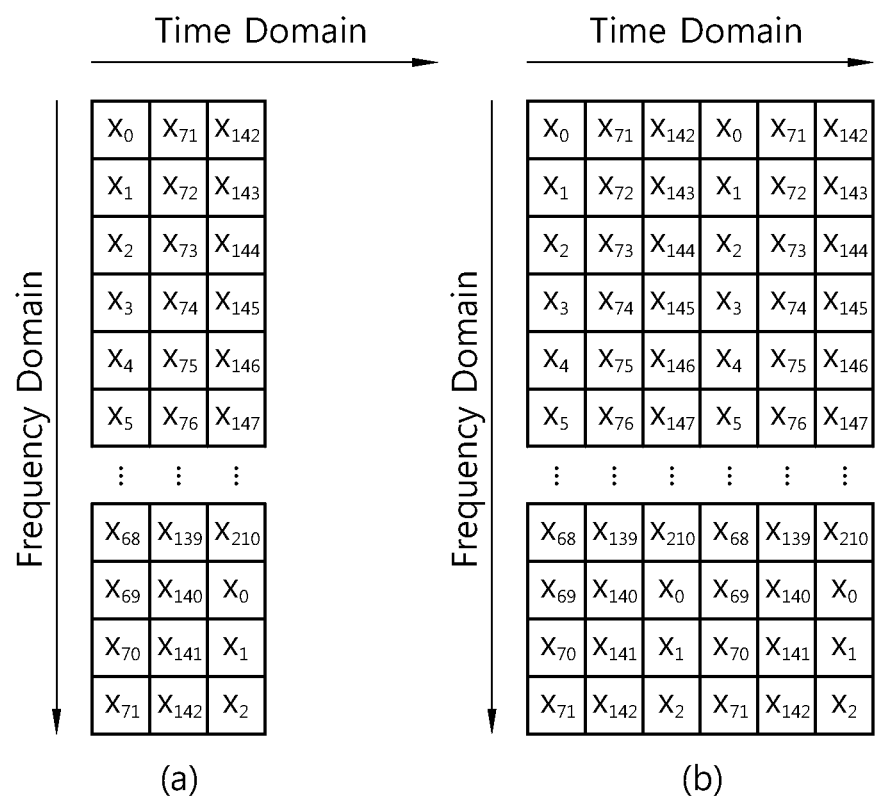
FIG. 5 shows an example of mapping a ranging preamble code of an S-RCH to an OFDMA symbol.

FIG. 5 shows an example of mapping a ranging preamble code of an S-RCH to an OFDMA symbol. In FIG. 5A, the ranging preamble code is mapped across 72 subcarriers in a frequency domain and 3 OFDMA symbols in a time domain. In FIG. 5B, a basic unit of FIG. 5A is repetitively mapped. That is, the ranging preamble code is mapped to $4^{th}$ to $6^{th}$ OFDMA symbols similarly to the ranging preamble code mapped to $1^{st}$ to $3^{rd}$ OFDMA symbols.

The ranging preamble code used in FIG. 5 can be determined by Equation 2.

$$x_p(k) = \exp\left(-j \cdot \pi \frac{r_p \cdot k \cdot (k + 1) + 2 \cdot k \cdot s_p \cdot N_{CS}}{N_{RP} - 3}\right), \quad \text{[Equation 2]}$$

$$k = 0, 1, \ldots, N_{RP} - 1$$

In Equation 2, p denotes an index of a ranging preamble code for an $n^{th}$ OFDMA symbol in a basic unit. The ranging preamble code of Equation 2 can be generated by applying an $s_p^{th}$ cyclic shift having a cyclic shift unit $N_{CS}$ from a ZC sequence having a root index $r_p$. $N_{RP}$ denotes a length of the ranging preamble code, and can be defined as $N_{RP}=214$ in Equation 2. An MS generates the ranging preamble code according to Equation 2, and maps the generated code to a plurality of OFDMA symbols as shown in FIG. 5.

Figure 6:
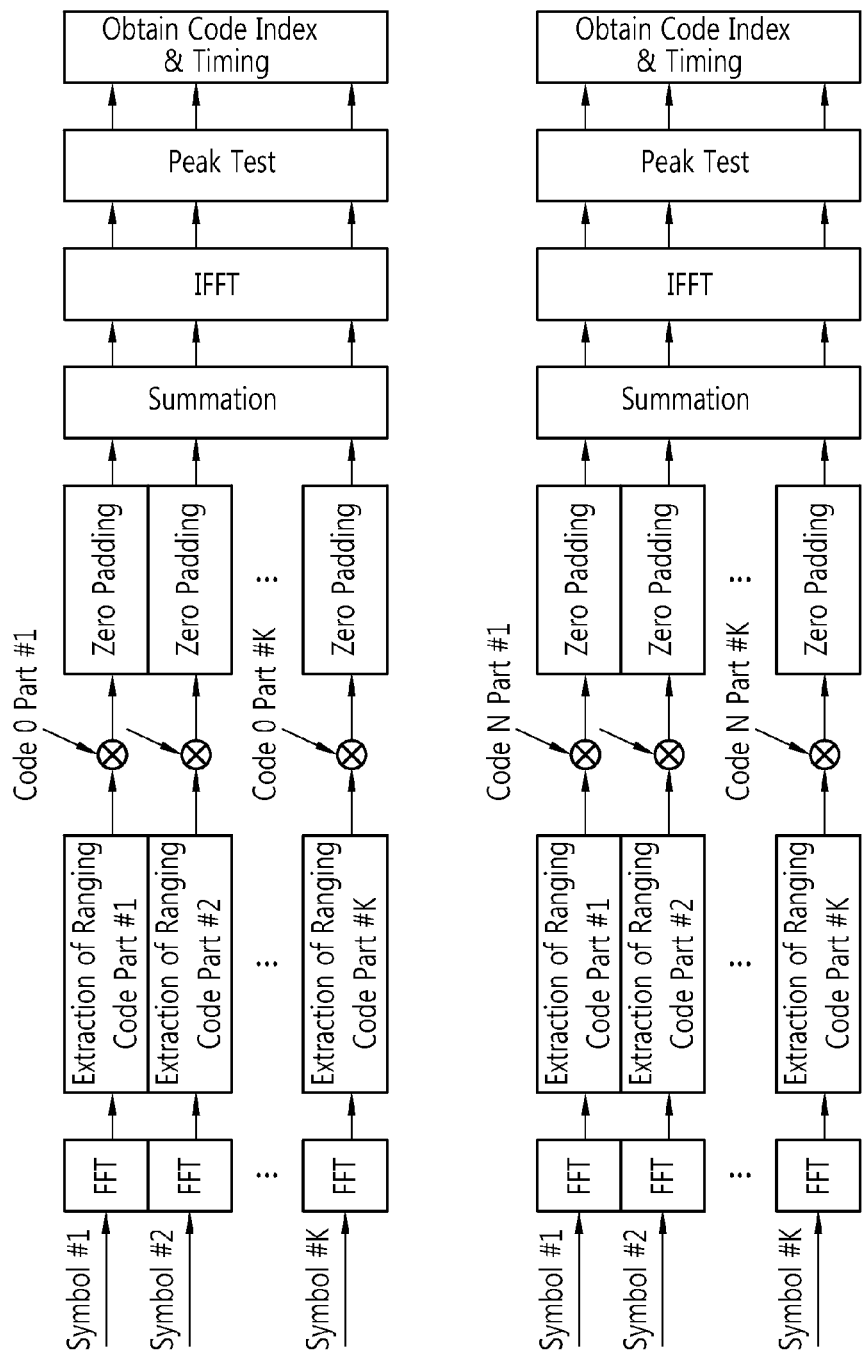
FIG. 6 is a block diagram of an algorithm for detecting a ranging preamble code.

FIG. 6 is a block diagram of an algorithm for detecting a ranging preamble code. Referring to FIG. 6, a receiving end multiplies a complex conjugate of the ranging preamble code for each OFDMA symbol in a frequency domain. Thereafter, the receiving end adds the OFDMA symbols in a subcarrier level, and detects the ranging preamble code by obtaining a correlation of the ranging preamble code through inverse fast Fourier transform (IFFT). Although the algorithm for detecting the ranging preamble code is not limited thereto, it will be described hereinafter that the ranging preamble code is detected by the detection algorithm of FIG. 6 for exemplary purposes only.

Meanwhile, the ranging preamble code of Equation 2 can be rewritten by Equation 3.

$$x_p(k) = \exp\left(-j \cdot \pi \frac{r_p \cdot k \cdot (k+1) + 2 \cdot k \cdot s_p \cdot N_{CS}}{N_{RP} - 3}\right), \quad \text{[Equation 3]}$$
$$k = 0, 1, \ldots, N_{RP} - 1$$
$$= \exp\left(-j \cdot \pi \frac{r_p \cdot k \cdot (k+1)}{N_{RP} - 3}\right) \cdot \exp\left(-j \cdot \pi \frac{2 \cdot k \cdot s_p \cdot N_{CS}}{N_{RP} - 3}\right),$$
$$k = 0, 1, \ldots, N_{RP} - 1$$

In Equation 3, $N_{RP}$ can be defined as $N_{RP}=214$. If $N_{RP}=214=N_{ZC}+3$, $N_{ZC}$ is 211 which is a prime number. This value can be substituted to Equation 3 to obtain Equation 4.

$$x_p(k) = \exp\left(-j \cdot \pi \frac{r_p \cdot k \cdot (k+1)}{N_{ZC}}\right) \cdot \exp\left(-j \cdot \pi \frac{2 \cdot k \cdot s_p \cdot N_{CS}}{N_{ZC}}\right), \quad \text{[Equation 4]}$$
$$k = 0, 1, \ldots, N_{ZC} + 2$$

A first term of Equation 4 is for generating a ZC sequence having a length of $N_{ZC}$. In this case, k may have a value up to $N_{ZC}+2$ extended by 3 samples other than a length $N_{ZC}-1$ of the original ZC sequence. A second term of Equation 4 is for cyclically shifting the generated ZC sequence by $S_p*N_{CS}$ with respect to the length $N_{ZC}$ in a time domain. That is, the ZC sequence generated by the first term is cyclically shifted by the second term, and is segmented and mapped across a plurality of OFDMA symbols since a length of a ranging preamble code is greater than the number of subcarriers in one OFDMA symbol.

FIG. 7 shows a case where a cyclic-shifted sequence is mapped to one OFDMA symbol or a plurality of OFDMA symbols. A code index of FIG. 7 is a sample index in a time domain.

FIG. 7A shows a case where a sequence having a length of 4 is mapped to one OFDMA symbol. In FIG. 7A, irrespective of whether a basis sequence is used or a cyclic shift is applied, a format of the basis sequence having a length of 4 is maintained without changes in one OFDMA symbol in which the sequence is mapped. Meanwhile, in the detection algorithm for the ranging preamble code of FIG. 6, the ranging preamble code is detected by obtaining a correlation in an OFDMA symbol unit. Therefore, when the ranging preamble code is detected in a receiving end, the ranging preamble code obtained by applying a cyclic shift to the basis sequence can be easily detected by obtaining only a correlation with respect to the basis sequence. In this case, the basis sequence is a sequence in which a cyclic shift is not applied. For example, in case of a ZC sequence or a padded ZC sequence, all sequences having different root indices can be used as the basis sequence.

FIG. 7B shows a case where a sequence having a length of 12 is mapped across 3 OFDMA symbols. In FIG. 7B, a basis sequence having a length of 12 is cyclically shifted by 2 samples and is mapped to 3 OFDMA symbols in a time domain. Code indices 10, 11, 0, and 1 are mapped to a $1^{st}$ OFDMA symbol. Code indices 2 to 5 are mapped to a $2^{nd}$ OFDMA symbol. Code indices 6 to 9 are mapped to a $3^{rd}$ OFDMA symbol. In this case, a format of the basis sequence having a length of 12 is not maintained in each OFDMA symbol. That is, since the format of the basis sequence is not maintained in each OFDMA symbol when detecting the ranging preamble code according to the detection algorithm of FIG. 6, a corresponding ranging preamble code cannot be detected by using only a correlation with respect to the basis sequence. Therefore, there is a need to obtain a correlation with respect to all sequences in which a cyclic shift is applied to the basis sequence. For example, if it is assumed that 8 cyclic-shifted sequences are used as one basis sequence, detection has to be performed by obtaining a correlation with respect to all of the 8 sequences by regarding all of the 8 cyclic-shifted sequences as the basis sequence.

When a long sequence is cyclically shifted and mapped to a plurality of OFDMA symbols as described in the example of FIG. 7, a sequence cannot be properly detected in each OFDMA symbol, and thus detection complexity is increased by the number of cyclic-shifted sequences. Therefore, a ranging preamble code generation method for avoiding the increase of detection complexity is required.

FIG. 8 shows a case where a ranging preamble code generated by the proposed ranging preamble code generation method is mapped to a plurality of OFDMA symbols. Similarly to FIG. 7B, this is a case where a sequence having a length of 12 is cyclically shifted and is mapped across 3 OFDMA symbols.

Referring to FIG. 8, a sequence obtained by performing a cyclic shift to a basis sequence is mapped to a plurality of OFDMA symbols, but the cyclic shift may be applied in each OFDMA symbol unit instead of being applied to all basis sequences. That is, the cyclic shift can be applied in a unit equal to or less than the number of subcarriers included in a corresponding OFDMA symbol in each OFDMA symbol. Accordingly, code indices 2, 3, 0, and 1 obtained by cyclically shifting code indices 0 to 3 by 2 samples are mapped to a $1^{st}$ OFDMA symbol. Code indices 6, 7, 4, and 5 obtained by cyclically shifting code indices 4 to 7 by 2 samples are mapped to a $2^{nd}$ OFDMA symbol. Code indices 10, 11, 8, and 9 obtained by cyclically shifting code indices 8 to 11 by 2 samples are mapped to a $3^{rd}$ OFDMA symbol. By applying the cyclic shift for each OFDMA symbol, all of cyclic-shifted sequences can be detected by using only a correlation with respect to a basis sequence without having to obtain a correlation with respect to all of the cyclic-shifted sequences.

Equation 5 shows an exemplary equation for generating a ranging preamble code by using the proposed invention.

$$x_p(n, k) = \exp\left(-j \cdot \pi \left(\frac{r_p \cdot (n \cdot 71 + k)(n \cdot 71 + k + 1)}{211} + \frac{2 \cdot k \cdot s_p \cdot N_{TCS}}{N_{FFT}}\right)\right), \quad \text{[Equation 5]}$$
$$k = 0, 1, \ldots, N_{RP} - 1; \quad n = 0, 1, 2$$

In Equation 5, p denotes an index of a ranging preamble code constituting a basic unit of a ranging channel determined by being cyclically shifted from a ZC sequence having a root index $r_p$. Herein, $r_p$ and $s_p$ can be defined by Equation 6.

[Equation 6]

$$r_p = \mathrm{mod}((1 - 2 \cdot \mathrm{mod}(\lfloor p/M \rfloor, 2)) \cdot (\lfloor p/M/2 \rfloor + r_0) + 211, 211)$$
$$s_p = \mathrm{mod}(p, M)$$
$$p = 0, 1, \ldots, N_{TOTAL} - 1$$

In Equation 6, a $p^{th}$ ranging preamble code is determined by using a root index $r_p$ determined from a start root index $r_0$. M denotes the number of sequences cyclically shifted per root index of a ZC sequence, and can be defined as M=1/G. $N_{TOTAL}$ denotes the total number of periodic ranging preamble codes per sector, and can be expressed by a sum of $N_{cont}$ and $N_{dedi}$, where $N_{cont}$ is the number of contention-based ranging preamble codes and $N_{dedi}$ is the number of dedicated ranging preamble codes.

$N_{TCS}$ denotes a cyclic shift unit in a time domain per OFDMA symbol based on a CP length, and can be defined as $N_{TCS} = G^* N_{FFT}$. G and $N_{FFT}$ can be defined by Table 1. $N_{RP}$ denotes a length of a ranging preamble code per OFDMA symbol, and can be defined as $N_{RP}=72$ in the present embodiment. n denotes an OFDMA symbol index in a basic unit across 3 OFDMA symbols.

Equation 7 shows another exemplary equation for generating the ranging preamble code by using the proposed method.

[Equation 7]

$$x_p(k) = \begin{cases} \exp\left(-j \cdot \pi \frac{r_p \cdot k \cdot (k+1)}{N_{RP} - 3}\right) \cdot \exp\left(-j \cdot \pi \frac{2 \cdot k \cdot s_p \cdot N_{CS}}{U_{CS2}}\right), \\ k = 0, 1, \ldots, 72 - 1 \\ \exp\left(-j \cdot \pi \frac{r_p \cdot k \cdot (k+1)}{N_{RP} - 3}\right) \cdot \exp\left(-j \cdot \pi \frac{2 \cdot \mathrm{mod}(k, U_{CS1}) \cdot s_p \cdot N_{CS}}{U_{CS2}}\right), \\ k = 72, 73, \ldots, 144 - 1 \\ \exp\left(-j \cdot \pi \frac{r_p \cdot k \cdot (k+1)}{N_{RP} - 3}\right) \cdot \exp\left(-j \cdot \pi \frac{2 \cdot \mathrm{mod}(k, U_{CS1}) \cdot s_p \cdot N_{CS}}{U_{CS2}}\right), \\ k = 144, 145, \ldots, N_{RP} - 1 \end{cases}$$

In Equation 7, $N_{RP}$, $U_{SC1}$, and $U_{CS2}$ can be defined as $N_{RP}=214$, $U_{SC1}=72$, and $U_{CS2}=72$. $N_{CS}$ denotes a cyclic shift unit within a length of $U_{CS2}$. $N_{CS}$ is a value determined based on $U_{CS2}$. For example, when 8 cyclic-shifted sequences are used per one root index, $N_{CS}$ can be defined as $N_{CS}=U_{CS2}/8$. In this case, to remove a round-off error or the like, a floor or ceil operation can be applied to $N_{CS}$.

Equation 8 shows another exemplary equation for generating the ranging preamble code by using the proposed method.

[Equation 8]

$$x_p(k) = \begin{cases} \exp\left(-j \cdot \pi \frac{r_p \cdot k \cdot (k+1)}{N_{RP} - 5}\right) \cdot \exp\left(-j \cdot \pi \frac{2 \cdot k \cdot s_p \cdot N_{CS}}{U_{CS2}}\right), \\ k = 0, 1, \ldots, 72 - 1 \\ \exp\left(-j \cdot \pi \frac{r_p \cdot k \cdot (k+1)}{N_{RP} - 5}\right) \cdot \exp\left(-j \cdot \pi \frac{2 \cdot \mathrm{mod}(k, U_{CS1}) \cdot s_p \cdot N_{CS}}{U_{CS2}}\right), \\ k = 72, 73, \ldots, 144 - 1 \\ \exp\left(-j \cdot \pi \frac{r_p \cdot k \cdot (k+1)}{N_{RP} - 5}\right) \cdot \exp\left(-j \cdot \pi \frac{2 \cdot \mathrm{mod}(k, U_{CS1}) \cdot s_p \cdot N_{CS}}{U_{CS2}}\right), \\ k = 144, 145, \ldots, N_{RP} - 1 \end{cases}$$

In Equation 8, $N_{RP}$, $U_{SC1}$, and $U_{CS2}$ can be defined as $N_{RP}=216$, $U_{SC1}=72$, and $U_{CS2}=72$. $N_{CS}$ denotes a cyclic shift unit within a length of $U_{CS2}$. $N_{CS}$ is a value determined based on $U_{CS2}$. For example, when 8 cyclic-shifted sequences are used per one root index, $N_{CS}$ can be defined as $N_{CS}=U_{CS2}/8$. In this case, to remove a round-off error or the like, a floor or ceil operation can be applied to $N_{CS}$.

Equation 9 is another format of Equation 7.

[Equation 9]

$$x_p(k) = \exp\left(-j \cdot \pi \frac{r_p \cdot k \cdot (k+1)}{N_{RP} - 3}\right) \cdot$$
$$\exp\left(-j \cdot \pi \frac{2 \cdot \mathrm{mod}(k, U_{CS1}) \cdot s_p \cdot N_{CS}}{U_{CS2}}\right),$$
$$k = 0, 1, \ldots, N_{RP} - 1$$
$$= \exp\left(-j \cdot \pi \frac{r_p \cdot k \cdot (k+1)}{N_{RP} - 3} - j \cdot \pi \frac{2 \cdot \mathrm{mod}(k, U_{CS1}) \cdot s_p \cdot N_{CS}}{U_{CS2}}\right),$$
$$k = 0, 1, \ldots, N_{RP} - 1$$

In Equation 9, $N_{RP}$, $U_{SC1}$, and $U_{CS2}$ can be defined as $N_{RP}=214$, $U_{SC1}=72$, and $U_{CS2}=72$. $N_{CS}$ denotes a cyclic shift unit within a length of $U_{CS2}$. $N_{CS}$ is a value determined based on $U_{CS2}$. For example, when 8 cyclic-shifted sequences are used per one root index, $N_{CS}$ can be defined as $N_{CS}=U_{CS2}/8$. In this case, to remove a round-off error or the like, a floor or ceil operation can be applied to $N_{CS}$.

Equation 10 is another format of Equation 8.

[Equation 10]

$$x_p(k) = \exp\left(-j \cdot \pi \frac{r_p \cdot k \cdot (k+1)}{N_{RP} - 5}\right) \cdot$$
$$\exp\left(-j \cdot \pi \frac{2 \cdot \mathrm{mod}(k, U_{CS1}) \cdot s_p \cdot N_{CS}}{U_{CS2}}\right),$$
$$k = 0, 1, \ldots, N_{RP} - 1$$
$$= \exp\left(-j \cdot \pi \frac{r_p \cdot k \cdot (k+1)}{N_{RP} - 5} - j \cdot \pi \frac{2 \cdot \mathrm{mod}(k, U_{CS1}) \cdot s_p \cdot N_{CS}}{U_{CS2}}\right),$$
$$k = 0, 1, \ldots, N_{RP} - 1$$

In Equation 10, $N_{RP}$, $U_{SC1}$, and $U_{CS2}$ can be defined as $N_{RP}=216$, $U_{SC1}=72$, and $U_{CS2}=72$. $N_{CS}$ denotes a cyclic shift unit within a length of $U_{CS2}$. $N_{CS}$ is a value determined based on $U_{CS2}$. For example, when 8 cyclic-shifted sequences are used per one root index, $N_{CS}$ can be defined as $N_{CS}=U_{CS2}/8$. In this case, to remove a round-off error or the like, a floor or ceil operation can be applied to $N_{CS}$. In Equation 9 and Equation 10, $U_{CS1}$ and $U_{CS2}$ may have different values. For example, $U_{CS1}$ and $U_{CS2}$ may be defined as $U_{CS1}=71$ and $U_{CS2}=72$.

Although it has been described in Equation 7 to Equation 10 that 72 subcarriers are used in a frequency domain, a less number of subcarriers may be used according to a mapping method of a ranging preamble code. In this case, the number of cyclic-shifted sequences may be not 72 but may be determined by a size of a detection window.

Figure 9:
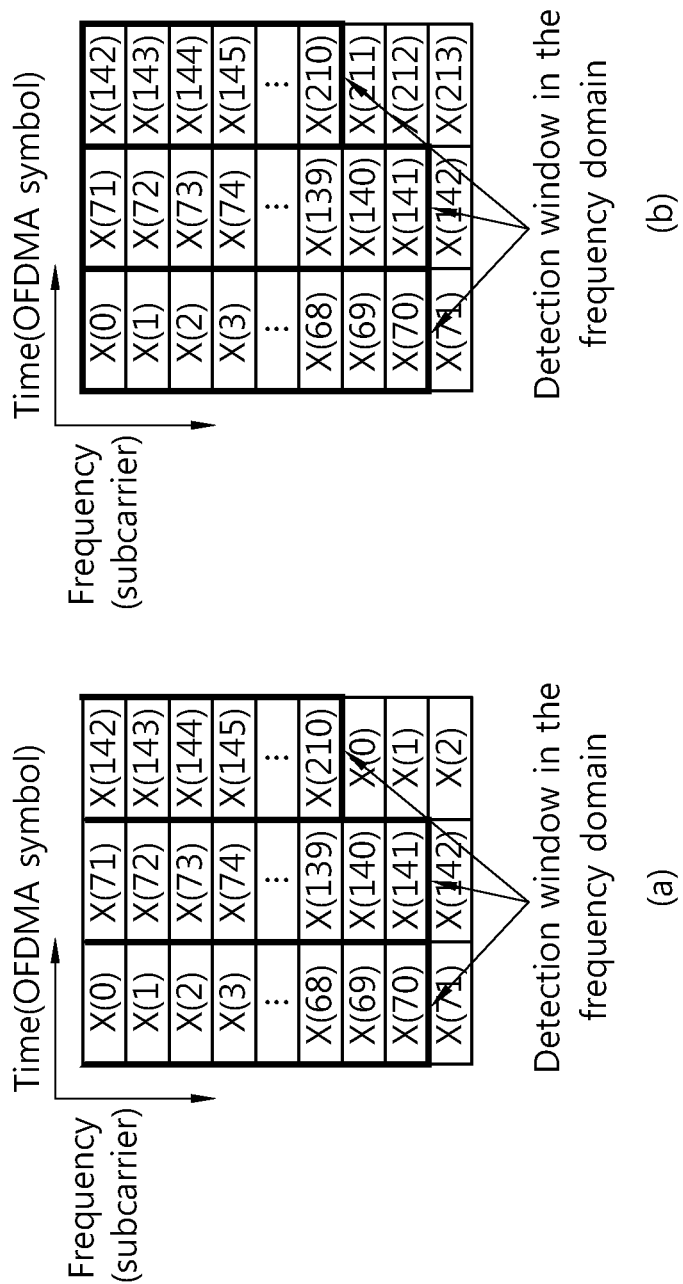
FIG. 9 to FIG. 12 shows an example of mapping a ranging preamble code according to the proposed ranging preamble code generation method.

FIG. 9 shows an example of mapping a ranging preamble code according to the proposed ranging preamble code generation method. An MS can map the ranging preamble code by using 71, 71, and 68 subcarriers of respective OFDMA symbols as a detection window, and can apply a cyclic shift in a unit corresponding to a size of the detection window of each OFDMA symbol. Since the ranging preamble code is detected by adding sequences mapped to each OFDMA symbol in a subcarrier unit even if the size of the detection window differs for each OFDMA symbol, the same unit of the cyclic shift is preferably applied to each OFDMA symbol.

Equation 11 shows an exemplary equation for generating a ranging preamble code when the ranging preamble code is mapped as shown in FIG. 9.

[Equation 11]

$$x_p(k) = \exp\left(-j \cdot \pi \frac{r_p \cdot k \cdot (k+1)}{N_{RP} - 3}\right) \cdot$$
$$\exp\left(-j \cdot \pi \frac{2 \cdot \mathrm{mod}(k, U_{CS1}) \cdot s_p \cdot N_{CS}}{U_{CS2}}\right),$$
$$k = 0, 1, \ldots, N_{RP} - 1$$
$$= \exp\left(-j \cdot \pi \frac{r_p \cdot k \cdot (k+1)}{N_{RP} - 3} - j \cdot \pi \frac{2 \cdot \mathrm{mod}(k, U_{CS1}) \cdot s_p \cdot N_{CS}}{U_{CS2}}\right),$$
$$k = 0, 1, \ldots, N_{RP} - 1$$

In Equation 11, $N_{RP}$, $U_{SC1}$, and $U_{CS2}$ can be defined as $N_{RP}=214$, $U_{SC1}=71$, and $U_{CS2}=71$. That is, a denominator of a second term of Equation 11 differs from that of Equation 9. $N_{CS}$ denotes a cyclic shift unit within a length of $U_{CS2}$. $N_{CS}$ is a value determined based on $U_{CS2}$. For example, when 8 cyclic-shifted sequences are used per one root index, $N_{CS}$ can be defined as $N_{CS}=U_{CS2}/8$. In this case, to remove a round-off error or the like, a floor or ceil operation can be applied to $N_{CS}$. Further, in Equation 11, $U_{CS1}$ and $U_{CS2}$ may have different values. For example, $U_{CS1}$ and $U_{CS2}$ may be defined as $U_{CS1}=72$ and $U_{CS2}=71$.

Figure 10:
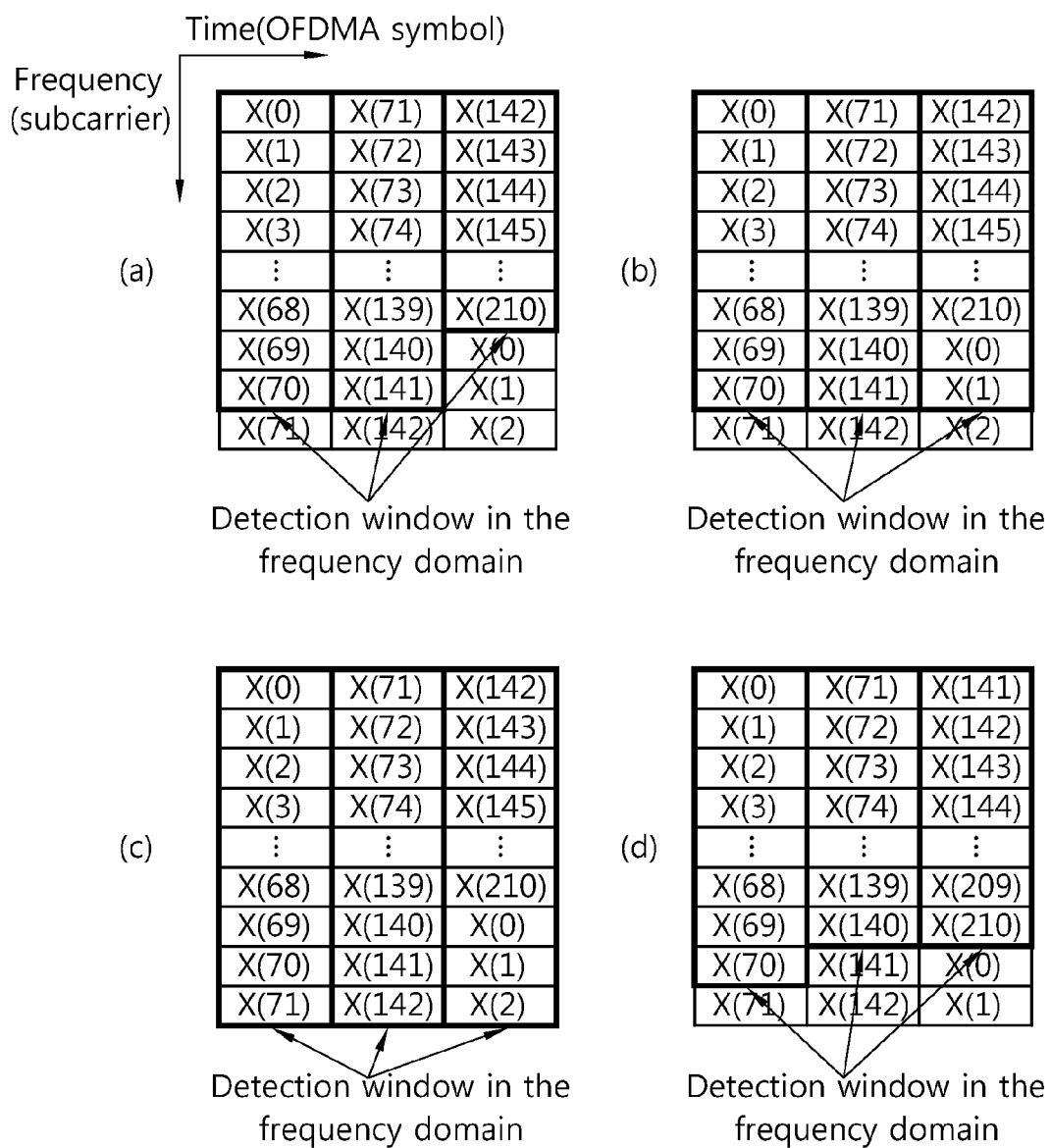
Figure 11:
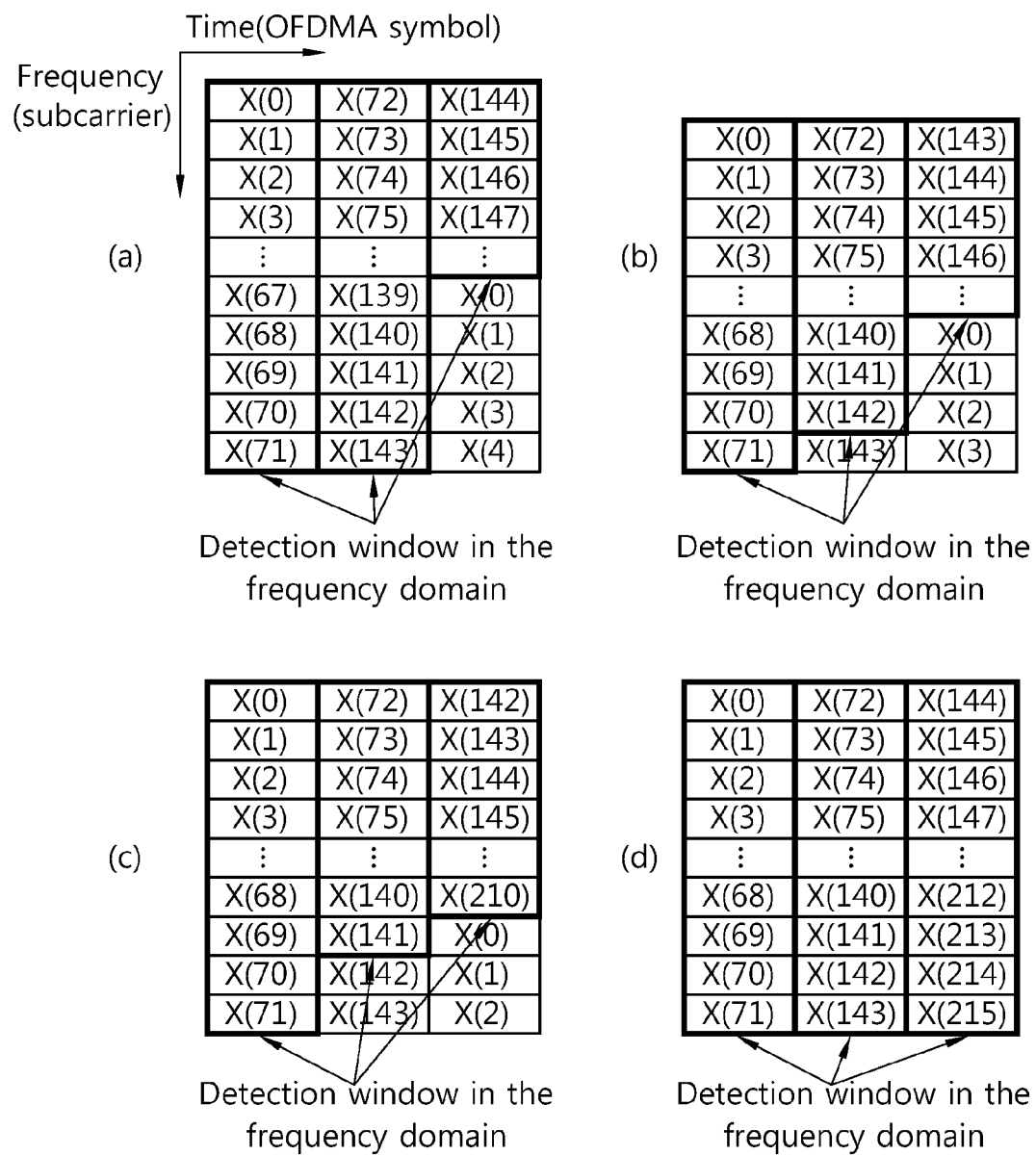

FIG. 10 and FIG. 11 show another example of mapping a ranging preamble code according to the proposed ranging preamble code generation method.

In each embodiment, an MS can map the ranging preamble code to 3 OFDMA symbols by variously changing a size of a detection window. An equation for generating the ranging preamble code can also vary depending on a mapping method. For example, when a sample of the same sequence is applied to a plurality of OFDMA symbols as shown in FIG. 10A, the ranging preamble code can be generated by differentiating for each OFDMA symbol. Equation 12 shows an exemplary equation for generating a ranging preamble code when the ranging preamble code is mapped as shown in FIG. 10A.

[Equation 12]

$$x_p(k) = \begin{cases} \exp\left(-j \cdot \pi \frac{r_p \cdot k \cdot (k+1)}{N_{RP}-3}\right) \cdot \exp\left(-j \cdot \pi \frac{2 \cdot \mathrm{mod}(k, U_{CS1}) \cdot s_p \cdot N_{CS}}{U_{CS2}}\right), \\ k = 0, 1, \ldots, 72 - 1, \text{ for 1st symbol} \\ \exp\left(-j \cdot \pi \frac{r_p \cdot k \cdot (k+1)}{N_{RP}-3}\right) \cdot \exp\left(-j \cdot \pi \frac{2 \cdot \mathrm{mod}(k, U_{CS1}) \cdot s_p \cdot N_{CS}}{U_{CS2}}\right), \\ k = 71, 73, \ldots, 143 - 1, \text{ for 2nd symbol} \\ \exp\left(-j \cdot \pi \frac{r_p \cdot k \cdot (k+1)}{N_{RP}-3}\right) \cdot \exp\left(-j \cdot \pi \frac{2 \cdot \mathrm{mod}(k, U_{CS1}) \cdot s_p \cdot N_{CS}}{U_{CS2}}\right), \\ k = 142, 143, \ldots, N_{RP} - 1, \text{ for 3rd symbol} \end{cases}$$

$$= \begin{cases} \exp\left(-j \cdot \pi \frac{r_p \cdot k \cdot (k+1)}{N_{RP}-3}\right) \cdot \exp\left(-j \cdot \pi \frac{2 \cdot k \cdot s_p \cdot N_{CS}}{U_{CS2}}\right), \\ k = 0, 1, \ldots, 72 - 1, \text{ for 1st symbol} \\ \exp\left(-j \cdot \pi \frac{r_p \cdot k \cdot (k+1)}{N_{RP}-3}\right) \cdot \exp\left(-j \cdot \pi \frac{2 \cdot (k-71) \cdot s_p \cdot N_{CS}}{U_{CS2}}\right), \\ k = 71, 73, \ldots, 143 - 1, \text{ for 2nd symbol} \\ \exp\left(-j \cdot \pi \frac{r_p \cdot k \cdot (k+1)}{N_{RP}-3}\right) \cdot \exp\left(-j \cdot \pi \frac{2 \cdot (k-142) \cdot s_p \cdot N_{CS}}{U_{CS2}}\right), \\ k = 142, 143, \ldots, N_{RP} - 1, \text{ for 3rd symbol} \end{cases}$$

In Equation 12, $N_{RP}$, $U_{SC1}$, and $U_{CS2}$ can be defined as $N_{RP}=214$, $U_{SC1}=72$, and $U_{CS2}=72$. That is, a denominator of a second term of Equation 12 differs from that of Equation 9. $N_{CS}$ denotes a cyclic shift unit within a length of $U_{CS2}$. $N_{CS}$ is a value determined based on $U_{CS2}$. For example, when 8 cyclic-shifted sequences are used per one root index, $N_{CS}$ can be defined as $N_{CS}=U_{CS2}/8$. In this case, to remove a round-off error or the like, a floor or ceil operation can be applied to $N_{CS}$. Further, in Equation 12, $U_{CS1}$ and $U_{CS2}$ may have different values. For example, $U_{CS1}$ and $U_{CS2}$ may be defined as $U_{CS1}=71$ and $U_{CS2}=72$.

Although it has been described above that the cyclic shift is applied by using a value equal to or less than the number of subcarriers included in each OFDMA symbol as a cyclic shift unit, this is for exemplary purposes only, and thus the cyclic shift can be applied in a unit of a value greater than a length of a sequence for each OFDMA symbol. For example, $N_{FFT}$ can be substituted to Equation 7 to Equation 12, instead of $U_{CS2}$. $N_{CS}$ denotes a cyclic shift unit within a length of $U_{CS2}$ and is determined according to $U_{CS2}$.

Figure 12:
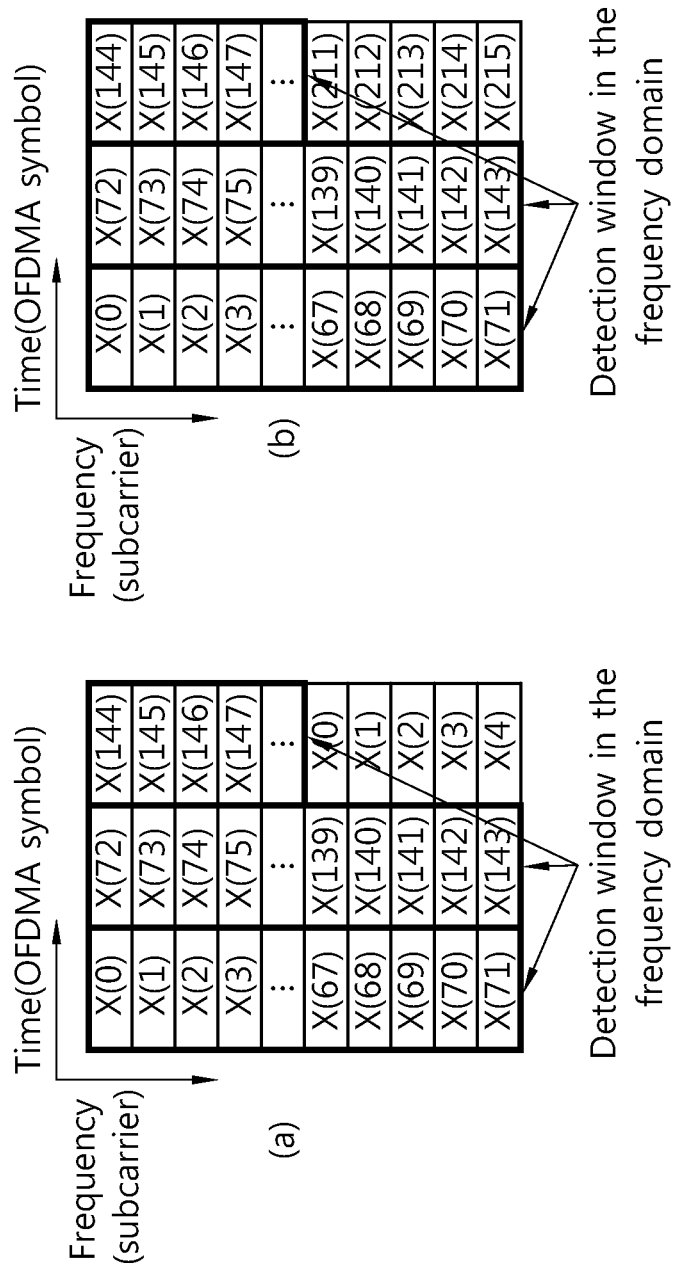

FIG. 12 shows another example of mapping a ranging preamble code according to the proposed ranging preamble code generation method. When the ranging preamble code is mapped as shown in FIG. 12, the ranging preamble code can be generated by Equation 13.

[Equation 13]

$$x_p(k) = \begin{cases} \exp\left(-j \cdot \pi \frac{r_p \cdot k \cdot (k+1)}{N_{RP}-5}\right) \cdot \exp\left(-j \cdot \pi \frac{2 \cdot \mathrm{mod}(k, U_{CS1}) \cdot s_p \cdot N_{CS}}{U_{CS2}}\right), \\ k = 0, 1, \ldots, 72 - 1, \text{ for 1st symbol} \\ \exp\left(-j \cdot \pi \frac{r_p \cdot k \cdot (k+1)}{N_{RP}-5}\right) \cdot \exp\left(-j \cdot \pi \frac{2 \cdot \mathrm{mod}(k, U_{CS1}) \cdot s_p \cdot N_{CS}}{U_{CS2}}\right), \\ k = 72, 73, \ldots, 144 - 1, \text{ for 2nd symbol} \\ \exp\left(-j \cdot \pi \frac{r_p \cdot k \cdot (k+1)}{N_{RP}-5}\right) \cdot \exp\left(-j \cdot \pi \frac{2 \cdot \mathrm{mod}(k, U_{CS1}) \cdot s_p \cdot N_{CS}}{U_{CS2}}\right), \\ k = 144, 143, \ldots, N_{RP} - 1, \text{ for 3rd symbol} \end{cases}$$

$$= \begin{cases} \exp\left(-j \cdot \pi \frac{r_p \cdot k \cdot (k+1)}{N_{RP}-5}\right) \cdot \exp\left(-j \cdot \pi \frac{2 \cdot k \cdot s_p \cdot N_{CS}}{U_{CS2}}\right), \\ k = 0, 1, \ldots, 72 - 1, \text{ for 1st symbol} \\ \exp\left(-j \cdot \pi \frac{r_p \cdot k \cdot (k+1)}{N_{RP}-5}\right) \cdot \exp\left(-j \cdot \pi \frac{2 \cdot (k-72) \cdot s_p \cdot N_{CS}}{U_{CS2}}\right), \\ k = 72, 73, \ldots, 144 - 1, \text{ for 2nd symbol} \\ \exp\left(-j \cdot \pi \frac{r_p \cdot k \cdot (k+1)}{N_{RP}-5}\right) \cdot \exp\left(-j \cdot \pi \frac{2 \cdot (k-144) \cdot s_p \cdot N_{CS}}{U_{CS2}}\right), \\ k = 144, 143, \ldots, N_{RP} - 1, \text{ for 3rd symbol} \end{cases}$$

$$= \exp\left(-j \cdot \pi \frac{r_p \cdot [(n \cdot U_{CS1}) + k] \cdot [(n \cdot U_{CS1}) + k + 1]}{N_{RP} - 5}\right) \cdot$$
$$\exp\left(-j \cdot \pi \frac{2 \cdot k \cdot s_p \cdot N_{CS}}{U_{CS2}}\right),$$
$$k = 0, 1, \ldots N_{RP2} - 1 \text{ for } n\text{-th symbol}(n = 0, 1, 2)$$

In Equation 13, $N_{RP}$ denotes a total sequence length, and $N_{RP2}$ denotes a length of a sequence in each OFDMA symbol. In Equation 13, $N_{RP}$, $U_{CS1}$, $U_{CS2}$, and $N_{RP2}$ may be defined as $N_{RP}=216$, $U_{CS1}=72$, $U_{CS2}=N_{FFT}$, and $N_{RP2}=72$. $N_{FFT}$ denotes an FFT size in OFDMA modulation and demodulation determined based on a bandwidth. For example, when the bandwidth is 5 MHz, 10 MHz, and 20 MH, $N_{FFT}$ is 512, 1024, and 2048, respectively. $N_{CS}$ is a value determined based on $U_{CS2}$. For example, when 8 cyclic-shifted sequences are used per one root index, $N_{CS}$ can be defined as $N_{CS}=U_{CS2}/8$.

Figure 13:
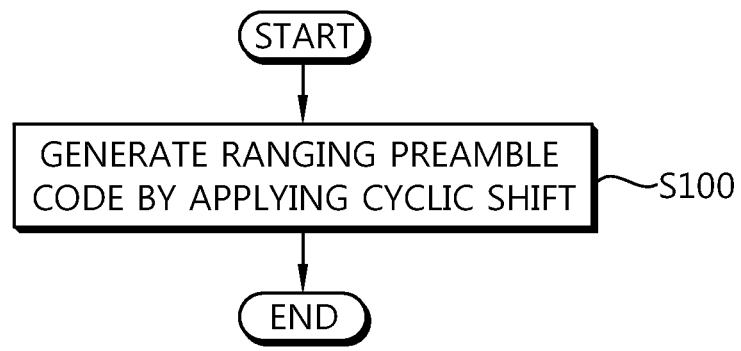
FIG. 13 is a flowchart showing the proposed ranging preamble code generation method according to an embodiment of the present invention.

FIG. 13 is a flowchart showing the proposed ranging preamble code generation method according to an embodiment of the present invention. In step S100, an MS generates a ZC sequence in which a cyclic shift is applied to each of a plurality of OFDMA symbols as a ranging preamble code. The cyclic shift can be applied for each OFDMA symbol.

Figure 14:
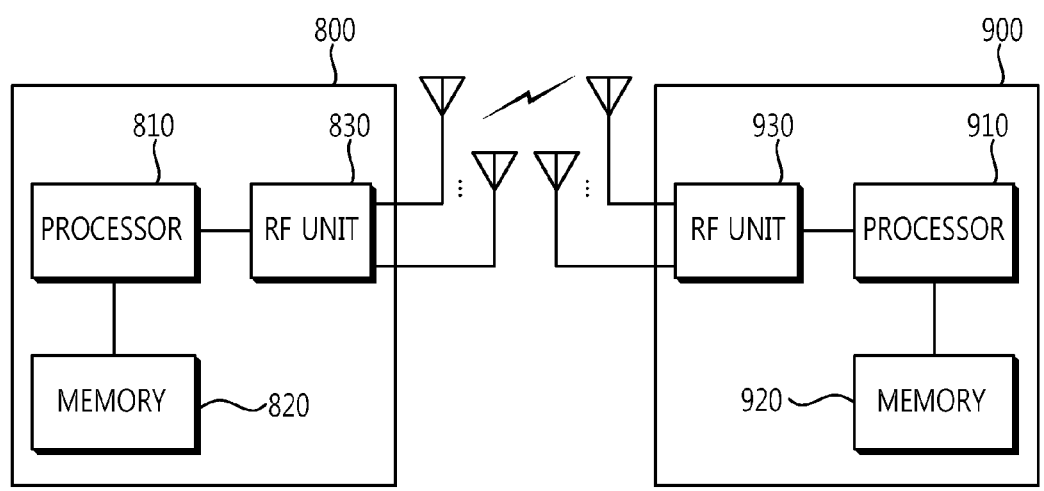
FIG. 14 is a block diagram showing a BS and an MS for implementing an embodiment of the present invention.

FIG. 14 is a block diagram showing a BS and an MS for implementing an embodiment of the present invention.

A BS 800 includes a processor 810, a memory 820, and a radio frequency (RF) unit 830. The processor 810 implements the proposed functions, processes, and/or methods. Layers of a radio interface protocol can be implemented by the processor 810. The memory 820 is coupled to the processor 810, and stores a variety of information for driving the processor 810. The RF unit 830 is coupled to the processor 810, and transmits and/or receives a radio signal.

An MS 900 includes a processor 910, a memory 920, an RF unit 930. The processor 910 implements the proposed functions, processes, and/or methods. The processor 910 generates a ZC in which a cyclic shift is applied to each of a plurality of OFDMA symbols as a ranging preamble code. The cyclic shift can be applied to each OFDMA symbol. Layers of a radio interface protocol can be implemented by the processor 910. The memory 920 is coupled to the processor 910, and stores a variety of information for driving the processor 910. The RF unit 930 is coupled to the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, a receiving end can use a ranging preamble code obtained by applying a cyclic shift to a basis sequence without increase of detection complexity.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of generating a ranging preamble code in a wireless communication system, the method comprising: determining by a hardware processor a cyclic shift using a cyclic shift unit in a time domain, the cyclic shift unit determined using a Fast Fourier Transform (FFT) size that is 512, 1024 or 2048 based on a bandwidth; generating a Zadoff-Chu (ZC) sequence in which the cyclic shift is applied for each of a plurality of Orthogonal Frequency Division Multiple Access (OFDMA) symbols as a ranging preamble code; and using the ranging preamble code for periodic ranging via a synchronized ranging channel (S-RCH), wherein the cyclic shift is determined by:

$$\exp\left(-\frac{j \cdot \pi \cdot 2 \cdot k \cdot s_p \cdot N_{TCS}}{N_{FFT}}\right), \quad k = 0, 1, \ldots, N_{RP} - 1,$$

where:
$s_p$ is a cyclic shift index,
$N_{TCS}$ is the cyclic shift unit per OFDMA symbol in the time domain,
$N_{FFT}$ is a fast Fourier transform (FFT) size, and
$N_{RP}$ is a length of the ranging preamble code per OFDMA symbol.

2. The method of claim 1, wherein $N_{TCS}=G*N_{FFT}$, where G is a cyclic prefix (CP) ratio.

3. The method of claim 1, wherein the ranging preamble code is determined by:

$$x_p(n, k) = \exp\left(-j \cdot \pi \left(\frac{r_p \cdot (n \cdot 71 + k)(n \cdot 71 + k + 1)}{k = 0, 1, \ldots, N_{RP}^2 - 1; \ n = 0, 1, 2} + \frac{2 \cdot k \cdot s_p \cdot N_{TCS}}{N_{FFT}}\right)\right),$$

where:
$r_p$ is a root index of the ZC sequence,
$s_p$ is a cyclic shift index,
$N_{TCS}$ is the cyclic shift unit per OFDMA symbol in the time domain,
$N_{FFT}$ is the FFT size,
$N_{RP}$ is a length of the ranging preamble code per OFDMA symbol, and
n is an OFDMA symbol index.

4. The method of claim 1, wherein a length of the ranging preamble code is 72.

5. The method of claim 1, wherein a number of the plurality of OFDMA symbols is 3.

6. The method of claim 1, further comprising mapping the ranging preamble code to each of the plurality of OFDMA symbols.

7. The method of claim 1, wherein a cyclic shift unit by which the cyclic shift is applied is equal to or less than a length of the ranging preamble code.

8. An apparatus for generating a ranging preamble code, the apparatus comprising: a radio frequency (RF) unit configured to at least transmit or receive a radio signal; and a hardware processor coupled to the RF unit wherein the processor: determines a cyclic shift using a cyclic shift unit in a time domain, the cyclic shift unit determined using a Fast Fourier Transform (FFT) size that is 512, 1024 or 2048 based on a bandwidth; generates a Zadoff-Chu (ZC) sequence in which the cyclic shift is applied for each of a plurality of orthogonal frequency division multiple access (OFDMA)

symbols as a ranging preamble code; and uses the ranging preamble code for periodic ranging via a synchronized ranging channel (S-RCH), wherein the cyclic shift is determined by:

$$\exp\left(-\frac{j \cdot \pi \cdot 2 \cdot k \cdot s_p \cdot N_{TCS}}{N_{FFT}}\right), \quad k = 0, 1, \ldots, N_{RP} - 1,$$

where:
$s_p$ is a cyclic shift index,
$N_{TCS}$ is the cyclic shift unit per OFDMA symbol in the time domain,
$N_{FFT}$ is a fast Fourier transform (FFT) size, and
$N_{RP}$ is a length of the ranging preamble code per OFDMA symbol.

9. The apparatus of claim 8, wherein the ranging preamble code is determined by:

$$x_p(n, k) = \exp\left(-j \cdot \pi\left(\frac{r_p \cdot (n \cdot 71 + k)(n \cdot 71 + k + 1)}{211} + \frac{2 \cdot k \cdot s_p \cdot N_{TCS}}{N_{FFT}}\right)\right),$$

$$k = 0, 1, \ldots, N_{RP} - 1; \quad n = 0, 1, 2$$

where:
$r_p$ is a root index of the ZC sequence,
$s_p$ is a cyclic shift index,
$N_{TCS}$ is the cyclic shift unit per OFDMA symbol in the time domain,
$N_{FFT}$ is the FFT size,
$N_{RP}$ is a length of the ranging preamble code per OFDMA symbol, and
n is an OFDMA symbol index.

10. The apparatus of claim 8, wherein a length of the ranging preamble code is 72.

11. The apparatus of claim 8, wherein a number of the plurality of OFDMA symbols is 3.

12. The apparatus of claim 8, wherein the processor maps the ranging preamble code to each of the plurality of OFDMA symbols.

13. The apparatus of claim 8, wherein $N_{TCS} = G * N_{FFT}$, where G is a cyclic prefix (CP) ratio.

14. The apparatus of claim 8, wherein a cyclic shift unit by which the cyclic shift is applied is equal to or less than a length of the ranging preamble code.

* * * * *